United States Patent
Naveh et al.

(10) Patent No.: US 9,430,299 B2
(45) Date of Patent: Aug. 30, 2016

(54) SYSTEM, METHOD AND PRODUCT FOR TASK ALLOCATION

(71) Applicant: International Business Machines Corporation, Armonk, NY (US)

(72) Inventors: Yehuda Naveh, Haifa (IL); Amir Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/452,532

(22) Filed: Aug. 6, 2014

(65) Prior Publication Data

US 2016/0041849 A1 Feb. 11, 2016

(51) Int. Cl.
*G06F 9/46* (2006.01)
*G06F 9/50* (2006.01)
*G06Q 10/10* (2012.01)
*G06N 7/00* (2006.01)

(52) U.S. Cl.
CPC .............. *G06F 9/5088* (2013.01); *G06Q 10/10* (2013.01); *G06N 7/005* (2013.01)

(58) Field of Classification Search
CPC .................................................... G06F 9/5088
See application file for complete search history.

(56) References Cited

U.S. PATENT DOCUMENTS

| | | | |
|---|---|---|---|
| 2012/0265573 A1 | 10/2012 | Van Pelt et al. | |
| 2013/0197954 A1* | 8/2013 | Yankelevich | G06Q 30/02 705/7.13 |
| 2013/0253969 A1 | 9/2013 | Das et al. | |
| 2014/0024462 A1 | 1/2014 | Qiang et al. | |
| 2014/0067451 A1 | 3/2014 | Balamurugan et al. | |
| 2014/0298343 A1* | 10/2014 | Rajan | G06F 9/5027 718/102 |

FOREIGN PATENT DOCUMENTS

| WO | 2011/134048 | 11/2011 |
|---|---|---|
| WO | 2014/033704 | 3/2014 |

OTHER PUBLICATIONS

Auer et al., "The non-stochastic multi-armed bandit problem", SIAM Journal on computing, vol. 32, Issue 1, 2003, pp. 48-77.
Singla et al., "Truthful Incentives in Crowdsourcing Tasks using Regret Minimization Mechanisms", WWW '13 Proceedings of the 22nd international conference on World Wide Web, pp. 1167-1178, 2013.

(Continued)

*Primary Examiner* — Emerson Puente
*Assistant Examiner* — Steven Do
(74) *Attorney, Agent, or Firm* — Ziv Glazberg

(57) ABSTRACT

A method comprising calculating for each agent, an average quality of tasks that were completed in the past by the agent; allocating tasks to the agents, wherein said allocating comprises selecting an agent to perform a task, the selection is based on the average quality of the agent; in response to the agent completing the task, computing a reward for the agent, wherein the reward is calculated according to a total contribution of the agent to the system by completing the task; whereby biasing said allocating to prefer allocating tasks to a first agent over a second agent, if a quality of the first agent is greater than a quality of the second agent, wherein said biasing is not dependent on prior knowledge of the qualities. Optionally, the agents choose whether or not to perform a task and an agent's quality affects the contributions of the agent performing tasks.

12 Claims, 3 Drawing Sheets

(56) References Cited

OTHER PUBLICATIONS

Tran-Thanh et al., "Incentives for Truthful Reporting in Crowdsourcing", AAMAS '12 Proceedings of the 11th International Conference on Autonomous Agents and Multiagent Systems—vol. 3, pp. 1329-1330 , 2012.

Stein et al., "Efficient Crowdsourcing of Unknown Experts Using Multi-Armed Bandits.", In, 20th European Conference on Artificial Intelligence (ECAI 2012), Montpellier, FR, Aug. 27-31, 2012 , pp. 768-773.

Ho et al., "Adaptive Contract Design for Crowdsourcing", EC '14 Proceedings of the fifteenth ACM conference on Economics and computation, pp. 359-376 , 2014.

Goel et al., "Matching Workers Expertise With Tasks: Incentives in Heterogeneous Crowdsourcing Markets", NIPS '13 Workshop on Crowdsourcing : Theory, Algorithms and Applications, 2013.

* cited by examiner

SYSTEM, METHOD AND PRODUCT FOR TASK ALLOCATION

TECHNICAL FIELD

The present disclosure relates to multi-task systems in general, and to allocating tasks to agents in a multi-task system, in particular.

BACKGROUND

Multi-task systems are system in which there is a plurality of separate tasks to be performed. Each task may be performed by a different agent and may be allocated accordingly. In some cases, the agents are not necessarily committed to the system and there may be no guarantee that they will perform tasks in a reasonable quality. The tasks may be tasks of performing a service, performing a computation, providing computational resources, producing content, providing ideas, or the like.

Crowd-sourcing is a methodology in which "free" agents perform tasks in a multi-task system. In crowd-sourcing, contributions are solicited from a large group of people, such as from online communities, rather than from traditional non-free agents, such as employees or suppliers. In some cases, crowd-sourcing represents the act of a company or institution taking a function once performed by employees and outsourcing it to an undefined (and generally large) network of people in the form of an open call. This can take the form of peer-production (e.g., when the job is performed collaboratively), but may also be undertaken by sole individuals. The process may combine efforts of numerous self-identified volunteering agents or part-time workers, where each contributor of their own initiative adds a small portion to the greater result.

Crowd-sourcing may be used for human-powered solving of large scale problems in numerous domains such as image classification, data entry, optical character recognition, recommendation, and proofreading. In recent years, more and more tasks are done via some sort of crowd sourcing. Examples include routing, such as using reports from a community (e.g., WAZE™), sourcing the community for funding (e.g. KICKSTARTER™), solving hard problems such as protein folding (e.g., FOLD IT™), developing software (e.g., SOURCEFORGE™) and more. In some cases, tasks are assigned to agents that perform them without long term relationship or commitment such as exists e.g. in a traditional work place or when using traditional contractors.

BRIEF SUMMARY

One exemplary embodiment of the disclosed subject matter is A method comprising: obtaining a stream of tasks in a system, wherein the tasks are to be performed by agents, wherein the agents choose whether or not to perform a task, wherein a quality of each agent affects contributions of performing tasks by the agent; calculating, by a processor, for each agent, an average quality of tasks in the system that were completed in the past by the agent; allocating, by the processor, the tasks to the agents, wherein allocating comprises selecting an agent to perform a task, wherein selecting is based on the average quality of the agent; obtaining an indication that the agent has completed the task; in response to the indication, computing, by the processor, a reward for the agent, wherein the reward is calculated according to a total contribution of the agent to the system by completing the task; outputting the reward to be provided to the user; whereby biasing the allocation to prefer allocating tasks to a first agent over a second agent, if a quality of the first agent is greater than a quality of the second agent, wherein the biasing is not dependent on prior knowledge of the qualities.

Another exemplary embodiment of the disclosed subject matter is a computerized apparatus having a processor, the processor being adapted to perform the steps of: obtaining a stream of tasks in a system, wherein the tasks are to be performed by agents, wherein the agents choose whether or not to perform a task, wherein a quality of each agent affects contributions of performing tasks by the agent; calculating for each agent, an average quality of tasks in the system that were completed in the past by the agent; allocating the tasks to the agents, wherein allocating comprises selecting an agent to perform a task, wherein selecting is based on the average quality of the agent; obtaining an indication that the agent has completed the task; in response to the indication, computing a reward for the agent, wherein the reward is calculated according to a total contribution of the agent to the system by completing the task; outputting the reward to be provided to the user; whereby biasing the allocation to prefer allocating tasks to a first agent over a second agent, if a quality of the first agent is greater than a quality of the second agent, wherein the biasing is not dependent on prior knowledge of the qualities.

Yet another exemplary embodiment of the disclosed subject matter is a computer program product comprising a computer readable storage medium retaining program instructions, which program instructions when read by a processor, cause the processor to perform a method comprising: obtaining a stream of tasks in a system, wherein the tasks are to be performed by agents, wherein the agents choose whether or not to perform a task, wherein a quality of each agent affects contributions of performing tasks by the agent; calculating for each agent, an average quality of tasks in the system that were completed in the past by the agent; allocating the tasks to the agents, wherein allocating comprises selecting an agent to perform a task, wherein selecting is based on the average quality of the agent; obtaining an indication that the agent has completed the task; in response to the indication, computing a reward for the agent, wherein the reward is calculated according to a total contribution of the agent to the system by completing the task; outputting the reward to be provided to the user; whereby biasing the allocation to prefer allocating tasks to a first agent over a second agent, if a quality of the first agent is greater than a quality of the second agent, wherein the biasing is not dependent on prior knowledge of the qualities.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
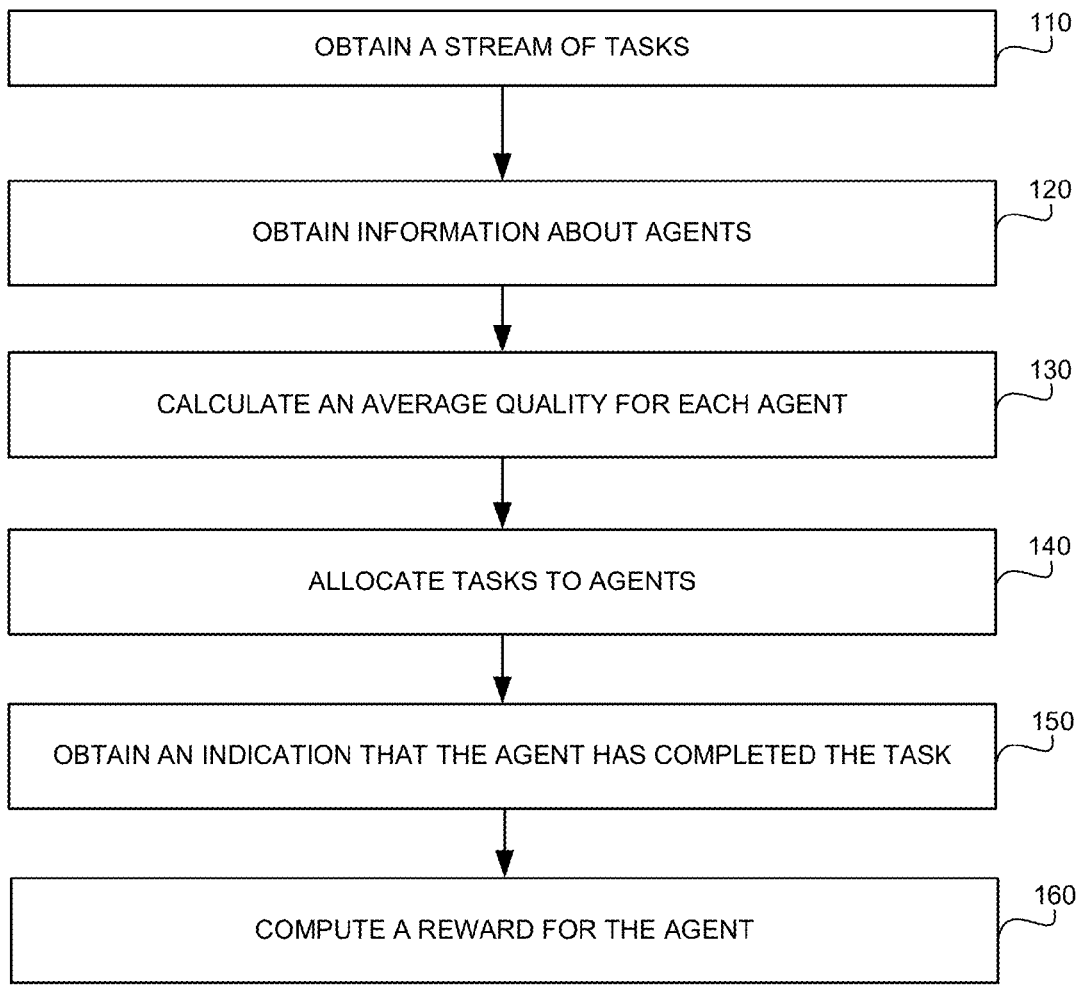
FIG. 1 shows a flowchart diagram of a method, in accordance with some exemplary embodiments of the disclosed subject matter.

One technical problem dealt with by the disclosed subject matter is to allocate tasks to agents in a multi-task system. The tasks may be assigned by a multi-task system to agents, which may not be committed to the system. In some cases, and in particular when the agents are humans and not computational devices, different agents may perform different tasks at different quality levels. As an example, the tasks may be to annotate images, which some agents may perform better than others. Other non-limiting examples of tasks may be rating search engine results, collection of labeled data, text translation, or the like. In such scenarios, in particular when high quality is an issue for the multi-task system, the system may compensate the agents, in money or otherwise, in order to obtain high quality performance. Moreover, the system is likely to be unaware of the agents' capabilities in advance (e.g., quality of the agent).

In some exemplary embodiments, the agents may choose whether or not to perform a task. The agents may and are potentially likely to maximize their own utility. A quality of an agent may affect contributions of performing tasks by the agent. In some exemplary embodiments, some agents may be more qualified than other agents. Additionally or alternatively, some agents may be more dedicated to the system than others. The disclosed subject matter may aspire to allocate the tasks to the most qualified agents. Such an allocation would cause the aggregated quality of the completed tasks to get close to the maximal potential aggregated quality. The most qualified agents may be agents having the highest qualities and hence they produce high quality results in performing the tasks. In some cases, the quality of an agent is high as the agent requires relatively a small amount of effort to complete the tasks (e.g., completes the task fast). In other cases, the quality of agent reflects the agent's capabilities, such as how smart the agent is, how diligently he performs his tasks, or the like.

In some cases, the quality of a task completed by an agent may be a statistical random variable whose median, average or mean value is the quality of the agent. As an example, an agent of high quality may produce low quality results in some cases. Hence, a quality of a recent completed task may not necessarily be indicative of the quality of the agent. As another example, in some cases, an agent may not be able to complete a task, and the task may be re-allocated to another agent. In such a case, the quality of the allegedly completed task by the agent may be a minimal quality such as indicated by zero or even a negative contribution to the system.

One technical solution is to select an agent to perform a task based on an average quality of the agent. In some exemplary embodiments, the average quality of the agent may be calculated based on the average quality of tasks in the system that were completed in the past by the agent. In some exemplary embodiments, the selection may be probabilistic so as to allow agents who have high quality who initially produced poor results to prove themselves.

In some exemplary embodiments, in case of a new agent, for which there is no available history, an estimation may be performed as to the quality of the agent. The estimated quality may be a default quality, an average quality of the other agents, or the like. In some exemplary embodiments, a machine learning module may be used to predict the quality of the agent based on attributes such as age, gender, nationality, location, demographic information, credentials, or the like. In some exemplary embodiments, the training set may be the agents for which the average quality is computed.

In some exemplary embodiments, if the quality of the agents was a-priori known, selecting the best agents could have been performed without a probabilistic selection, but rather based on the known qualities. As the qualities are revealed by the completed tasks, and as their quality may be poor even for agents with high qualities, the probabilistic selection may be useful to compensate for the lack of knowledge and provide all agents a chance of proving themselves even if they originally did not provide good results.

In some exemplary embodiments, the average quality of tasks in the system that were completed in the past by the agent may be calculated by dividing a summation of contributions to the system of tasks completed in the past by the agent, by a number of tasks in the system that were performed in the past by the agent.

In some exemplary embodiments, a reward may be calculated for each agent based on the completed tasks. The reward may be provided to the agent to incentivize the user to perform the current tasks in high quality as well and thereby to continue contributing to the system. In some exemplary embodiments, the reward may be provided in a monetary form, funny money, credits, recognition, or the like. In some exemplary embodiments, a reward for the agent may be computed after the agent has completed one or more tasks. The reward may be calculated according to total contribution of the agent to the system by completing the one or more tasks.

In some exemplary embodiment, allocating the tasks may be based on a probabilistic selection of an agent to perform the task. The probabilistic selection may be based on a set of probabilities, each of which is associated with an agent. The probability to select an agent may be based on an average quality of the agent. In some exemplary embodiment, allocating the tasks may comprise applying a probabilistic regret minimization algorithm to select agents to perform the tasks. A probability to select agent i by the probability regret minimization algorithm may be based on the following formula:

$$p_i = (1-\gamma) \cdot \frac{e^{q_i}}{\sum_{j=1}^{n} e^{q_j}} + \gamma \cdot \frac{1}{n}.$$

In some exemplary embodiments, $p_i$ may be the probability to select agent i. $\gamma$ may be a value between zero and one. In some cases, $\gamma$ may be a parameter value that is provided to the formula based on configurations, user preferences, or the like. $q_i$ may be the average quality associated with agent i. n may be a number of agents from which the selection is made.

One technical effect of utilizing the disclosed subject matter is to automatically assign tasks to the most qualified agents even in the absence of objective information regarding the qualification of each agent. Accordingly, the total gain of the system may be improved when compared to the gain of the system under a random assignment of tasks to agents. In some cases, more qualified agents are assigned more tasks than less qualified agents. The more qualified agents may be rewarded more than the less qualified agents, both when viewing per task reward and a total reward. The system is therefore configured to allocate its resources in a manner which invests more in incentivizing the agents which are most qualified to assist the system in accomplishing its goals. The incentives that are provided to the agents are also configured to incentivize the more qualified agents to take on more tasks, invest more effort and contribute more to the system than less qualified agents.

In some exemplary embodiments, the automatic allocation of the disclosed subject matter together with the computed rewards are implemented in a computerized environment, which is capable of monitoring a large number of agents and completed tasks and is capable of efficiently allocating, in a relatively rapid manner, the tasks to the agents so as not to cause any delay in allocating tasks. In fact, in some cases, the agents may be unaware of the allocation mechanism and less qualified agents who are not assigned a task may simply assume that there are no task available and not that the tasks are constantly being allocated to other, more qualified, agents.

In some exemplary embodiments, the disclosed subject matter may be useful in loosely-coupled organizations such as those employing crowd sourcing methodologies to incentivize high quality agents to contribute more and low quality agents to contribute less.

Referring now to FIG. 1 showing a flowchart diagram of a method, in accordance with some exemplary embodiments of the disclosed subject matter.

In Step 110, a stream of tasks in a system, such as a multi-task system, may be obtained. The tasks may tasks that are to be performed by agents. The agents may choose whether or not to perform a task.

In some exemplary embodiments, the tasks may be discrete tasks broken out of a higher-level task. The discrete tasks may be handled by several distributed agents. The tasks may or may not be related to each other, such as some tasks may be performed in sequence, some tasks may be performed in parallel, or the like.

In some exemplary embodiments, the tasks may be technical tasks, such as: translation tasks, transcription tasks, photo tagging, keyword optimization tasks, data verification tasks, testing tasks (e.g., website testing tasks, beta software testing tasks, etc.), article writing tasks, or the like. Additionally or alternatively, the tasks may be creative Tasks. For example: design tasks, video producing tasks, or the like.

In Step 120, information about agents may be obtained. The information about agents may include information about performance of an agent in tasks performed in the past by the agent, information about a contribution of an agent to the system, or the like. The information does not include a-priori known quality of each agent. In some exemplary embodiments, a quality of an agent may affect contribution of performing tasks by the agent.

In Step 130, an average quality may be calculated for each agent based on the agent's past performance in the system. The average quality may be an average quality of tasks in the system that were completed in the past by the agent. In some exemplary embodiments, the average quality of an agent may be calculated as an average of qualities of tasks in the system, completed in the past by the agent. A quality of a task performed by an agent may be measured by a contribution of the completed task to the system. In some exemplary embodiments, the average quality of tasks in the system that were completed in the past by the agent may be calculated by dividing a summation of contributions to the system of tasks completed in the past by the agent, by a number of tasks in the system that were performed in the past by the agent. However, it will be noted that the average quality of tasks may be computed in a different manner.

In some exemplary embodiments, the average quality of tasks in the system, performed by an agent may be calculated based on the following formula:

$$q_i = \frac{1}{n_i}.$$

$\Sigma_{j(i)} v_j$. In some exemplary embodiments, $n_i$ may be a number of tasks in the system that were performed in the past by agent. $v_j$ may be an quality of task j, which was performed by agent i.

In Step 140, the tasks may be allocated to the agents. In some exemplary embodiments, an agent may be selected to perform a task based on the average quality of the agent.

In some exemplary embodiments, allocating the tasks may be based on a probabilistic selection of an agent to perform a task. The probabilistic selection may be based on a set of probabilities. Each agent have a probability to be selected. Each probability may be based on an average quality of the agent.

In some exemplary embodiments, allocating the tasks may be based on applying a probabilistic regret minimization algorithm to select agents to perform the tasks. The probabilistic regret minimization algorithm may be implement an online learning and estimation of the agents' qualities. In some exemplary embodiments, regret may be defined as the difference between an actual payoff and a payoff that would have been obtained if a different course of action had been chosen. The probabilistic regret minimization algorithm may be based on minimizing the worst-case regret. The aim of the minimization may be to perform as closely as possible to the optimal course. In some exemplary embodiments, the regret may be selecting a wrong agent to complete the task or not selecting the best agent to complete the task.

In some exemplary embodiment, a probability to select agent i by the probability regret minimization algorithm may be based on the following formula:

$$p_i = (1-\gamma) \cdot \frac{e^{q_i}}{\sum_{j=1}^{n} e^{q_j}} + \gamma \cdot \frac{1}{n}.$$

In some exemplary embodiments, $\gamma$ may be a value between zero and one. $q_i$ may be the average quality associated with agent i. In some exemplary embodiments, n may be a number of agents from which the probability minimization algorithm is configured to select. The probability to select an agent may combine a uniform distribution $$\left(e.g., \frac{1}{n}\right)$$

and a distribution which assign to each agent a probability mass that is exponential in the estimated cumulative quality of the agent $$\left( \text{e.g., } \frac{e^{q_i}}{\sum_{j=1}^{n} e^{q_j}} \right).$$

Using an exponential function may allow for a slight advantage of one agent of another to provide a meaningful biasing of the allocation in favor of the better agent.

In some exemplary embodiments, allocating the tasks may be biased to prefer allocating tasks to a first agent over a second agent, if an estimated quality of the first agent is greater than an estimated quality of the second agent. The biasing may not dependent on prior knowledge of the actual qualities of the agents.

In Step 150, an indication that the agent has completed the task may be obtained. In response to the indication, a reward, in Step 160 may be computed. The reward may be calculated according to a total contribution of the agent to the system by completing the task.

In some exemplary embodiments, the reward may be monotone in a quantity of the total contribution of the agent to the system. In some exemplary embodiments, the reward may be linear with the total contribution of the agent to the system. In some exemplary embodiments, the reward may be computed as a linear function of a total contribution of the agent to the system. The total contribution of agent i to the system, denoted u(i), may be calculated based on the following formula: $u(i) = \Sigma_{j(i)} v_j$.

In some exemplary embodiments, the method of FIG. 1 may be performed repeatedly, so as to allocate new tasks to the agents and compute additional rewards to the agents over time. In some exemplary embodiments, information of tasks that were completed in the past may be retained in a computer readable media such as a data storage, and may be retrieved when required for any of the steps of FIG. 1.

Figure 2:
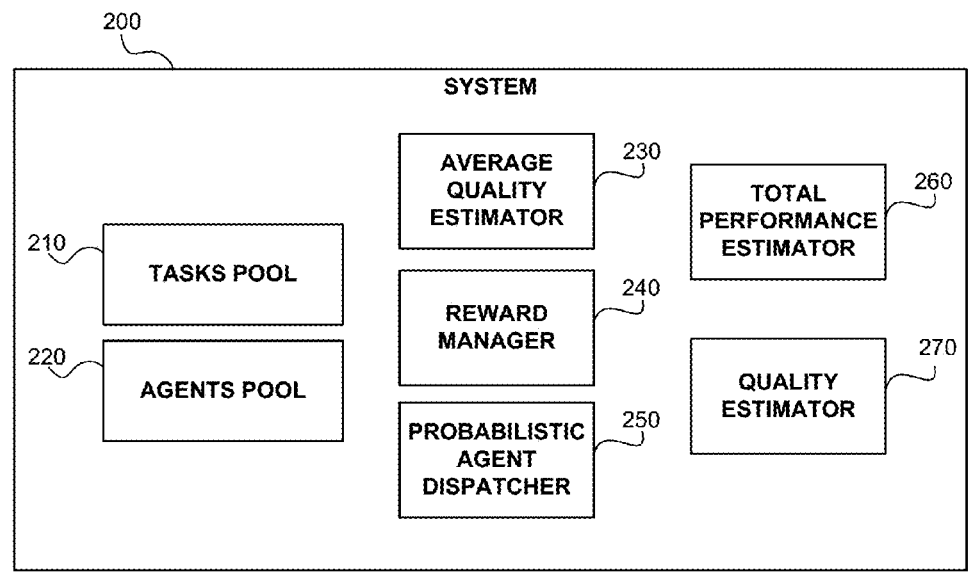
FIG. 2 shows an illustration of a computerized system, in accordance with some exemplary embodiments of the disclosed subject matter.

Referring now to FIG. 2 showing an illustration of a computerized system in accordance with some exemplary embodiments of the disclosed subject matter.

In some exemplary embodiments, the computerized system 200 may comprise a Tasks Pool 210, such as retained by a storage device. Tasks Pool 210 may comprise tasks that are generated by a multi-task system. In some cases, the system may continuously populate new tasks and store them in Tasks Pool 210 to be dispatched to agents, in accordance with the disclosed subject matter. In some exemplary embodiments, there may be different types of tasks. In some cases, different agents may be associated with performing different types of tasks. Additionally or alternatively, the competency of an agent may be different with respect to different types of tasks. As an example, one agent may be have high quality with respect to tasks of a first type (e.g., completes tasks of the first type with an average high quality), while the same agent may have a low quality with respect to tasks of a second type.

In some exemplary embodiments, an Agents Pool 220 may retain a list of agents that can perform the tasks. In some cases, Agents Pool 220 may comprise all agents that are registered with the system. Additionally or alternatively, Agents Pool 220 may comprise all active agents of the system, such as but not limited to agents that are currently willing and able to perform tasks. As an example, Agents Pool 220 may be updated in accordance with a status of each agent. In some exemplary embodiments, only agents that are currently connected to the multi-task system may be considered as active agents, as they can receive a task. In some exemplary embodiments, the agents may register when requesting to be assigned with a task, and Agents Pool 220 may comprise only those agents who registered accordingly.

In some exemplary embodiments, an Average Quality Estimator 230 may be configured to compute an average quality of tasks in the system that were completed in the past by an agent. In some exemplary embodiments, Average Quality Estimator 230 may be used to compute the average quality with respect to each agent in Agents Pool 220. In some exemplary embodiments, Average Quality Estimator 230 may compute the average quality of tasks in the system that were completed in the past by an agent by dividing a summation of contributions to the system of tasks completed in the past by the agent, by a number of tasks in the system that were performed in the past by the agent. The contributions to the system of tasks completed in the past by an agent may be provided, directly or indirectly, by a Quality Estimator 270. In some exemplary embodiments, the computation may be based on all historic data or based on data that was obtained within a predetermined timeframe, such as in last month, the last year, the last day, or the like. Additionally or alternatively, the computation may be performed based only of tasks of the same type as a target task that is to be dispatched (e.g., by a Probabilistic Agent Dispatcher 250).

In some exemplary embodiments, Quality Estimator 270 may be configured to estimate a quality of a task performed by an agent in the system. The quality may be estimated based on various factors, such as the time required to complete the task, the contribution of the task to the system, the results of the task, or the like. In some exemplary embodiments, the quality of a task is estimated upon its completion. The quality may be then be retained in a data storage (not shown) to be used in the future as part of the computations of Average Quality Estimator 230 that rely on tasks that were completed in the past. In some exemplary embodiments, the quality is retained together with an identifier of the agent that completed the task. Additionally or alternatively, the quality is retained together with a time stamp indicating a time of completion. Additionally or alternatively, the quality is retained together with a type of task.

In some exemplary embodiments, Probabilistic Agent Dispatcher 250 may be configured to select an agent from Agents Pool 220 to perform a task from Tasks Pool 210. Probabilistic Agent Dispatcher 250 may select the agent based on the average quality of the agent, estimated by Average Quality Estimator 230, and optionally for the same type of tasks as the task to be dispatched. In some exemplary embodiment, Probabilistic Agent Dispatcher 250 may allocate the tasks based on a probabilistic selection of an agent to perform the task. The probabilistic selection may be based on a set of probabilities, each of which is associated with an agent from Agents Pool 220. The probability to select an agent may be based on an average quality of the agent. In some exemplary embodiment, Probabilistic Agent Dispatcher 250 may apply a probabilistic regret minimization algorithm to select agents to perform the tasks.

In some exemplary embodiments, a Reward Manager 240 may be configured to compute a reward for an agent, in response to obtaining an indication that the agent has completed the task that the agent was allocated to perform. Reward Manager 240 may calculate the reward according to the total contribution of the agent to the system by completing the task. The reward may be provided to the agent to incentivize the agent to continue contributing to the system. In some exemplary embodiments, Reward Manager 240 may compute a reward for an agent in a batch process by processing a total reward for more than one task completed by the agent and for which the agent was not yet rewarded. Reward Manager 240 may output the reward to another entity to provide the reward to the agent, such as a bookkeeping department. Additionally or alternatively, Reward Manager 240 may provide the reward to the agent, such as by increasing the credits balance in an account of the agent.

In some exemplary embodiments, Reward Manager 240 may calculate the reward r(i) for agent i based on the following formula: $r(i) = f \cdot \Sigma_{j(i)} v_j$. In some exemplary embodiments, $v_j$ may be the quality of task j performed by agent i. $v_j$ may be calculated by Quality Estimator 270. $\Sigma_{j(i)} v_j$ may be a summation of $v_j$ for all tasks j that are performed by agent i. f may be a parameter, such as a constant value, a parameter value set by the user or defined based on configurations or preferences. Additionally or alternatively, the value of f may be automatically computed by Reward Manager 240, as is explained further hereinbelow.

In some exemplary embodiments, a Total Performance Estimator 260 may be configured to evaluate the total performance of the system. In some exemplary embodiments, the total performance of the system may be calculated based on the system's gain. The system's gain may be calculated based on the quality of the tasks completed in the system in the past. Additionally or alternatively, the system's gain may be calculated based on the average quality of agents performing tasks in the system.

In some exemplary embodiments, Total Performance Estimator 260 may calculate the total performance of the system based on the following formula: $(1-f) \cdot \Sigma_{j(i)} n_i \cdot q_i$. In some exemplary embodiments, $q_i$ may be the average quality of agent i such as calculated by Average Quality Estimator 230. $n_i$ may be the number of tasks performed by agent i in the system. f may be the parameter used by Reward Manager 240 in calculating the rewards. f may be chosen by the system in order to optimize the total performance of the system. In some exemplary embodiments, the system may choose a value of parameter f that optimizes the system's gain. In some exemplary embodiments, the system may choose a value of parameter f by an optimization algorithm such as gradient descent method or the like.

In some exemplary embodiments, the difference between the optimal quality and the expected quality of a system in accordance with the disclosed subject matter may be bounded by $$\frac{1}{\sqrt{N}},$$

where IN is me number or tasks performed by the system so far.

Figure 3A:
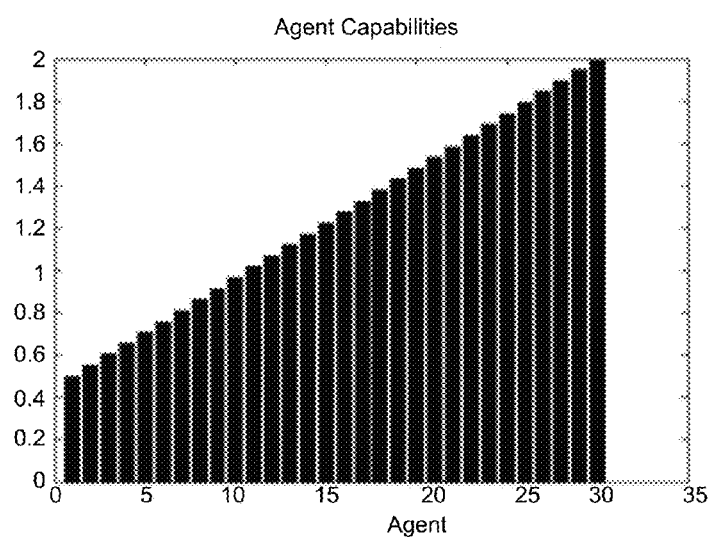
FIG. 3A-3C show illustrations of charts, in accordance with some exemplary embodiments of the disclosed subject matter.
Figure 3B:
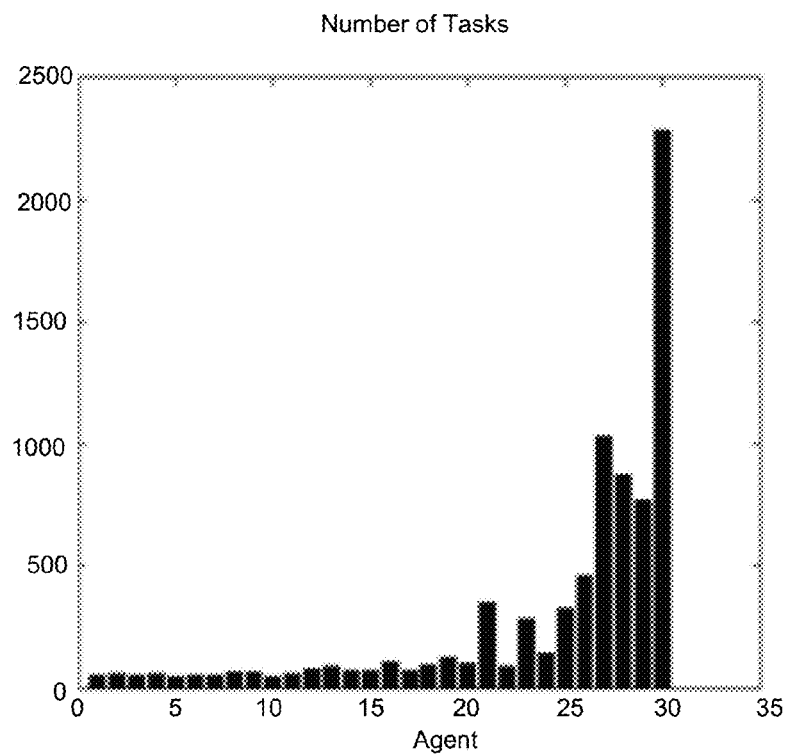
Figure 3C:
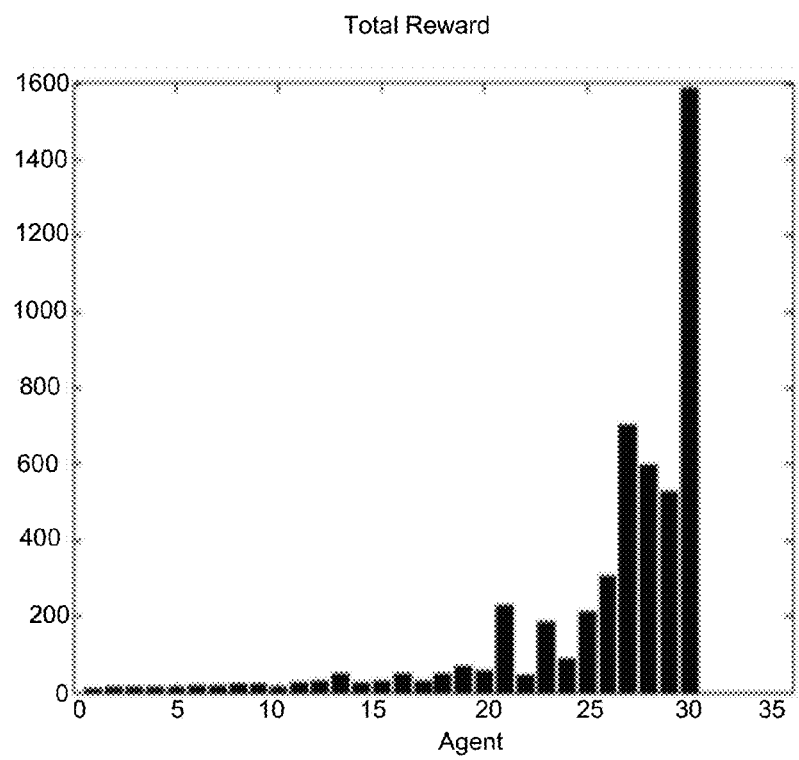

Referring now to FIGS. 3A-3C showing an illustration of charts in accordance with some exemplary embodiments of the disclosed subject matter.

A prototype of a system in accordance with the disclosed subject matter was devised and simulated. The prototype simulated a stochastic system where tasks are dispatched to agents without the system having prior knowledge of the quality of the agents.

In the simulation there are 30 agents having different capabilities as shown in FIG. 3A. For convenience purposes, the agents were ordered and numbered based on their capabilities such that the first agent has the worst quality while the last agent has the best quality.

The simulation dispatched 8000 tasks to the 30 agents.

The chart illustrated in FIG. 3B shows the number of tasks allocated to each agent in the system. The highest number of tasks was allocated to the agent with the best capability, while agents with a worst capability got a lowest number of tasks. Generally, more qualified agents received and performed a larger number of tasks, though this is not a strict rule. For example, agent #27 received more tasks than agents #28 and #29.

The chart illustrated in FIG. 3C shows the total reward calculated for each agent in the system. The agent with the highest capability value was awarded with the highest total reward, while agents with a lower capabilities got lower total rewards. Again, generally, more qualified agents received higher rewards, though this is not a strict rule.

When comparing these results with those that would have been received with a random agent selection, the overall gain of the prototype is about 35%. If an hypothetical algorithm in which all tasks are always dispatched to the best agent is simulated (i.e., optimal quality of the system), the gain of that system over the random selection would be 60%. Hence, the 35% improvement provided by the prototype provides a substantial improvement in compression to the random agent selection algorithm.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a stream of tasks in a system, wherein the tasks are to be performed by agents, wherein the agents choose whether or not to perform a task, wherein a quality of each agent affects contributions of performing tasks by the agent;
   calculating, by a processor, for each agent, an average quality of tasks in the system that were completed in the past by the agent;
   allocating, by the processor, the tasks to the agents, wherein said allocating comprises selecting an agent to perform a task, wherein said selecting is based on the average quality of the agent, wherein said allocating comprises applying a probabilistic regret minimization algorithm to select agents to perform the tasks, wherein a probability to select agent i by the probability regret minimization algorithm is based on the following formula:

$$p_i = (1-\gamma) \cdot \frac{e^{q_i}}{\sum_{j=1}^{n} e^{q_j}} + \gamma \cdot \frac{1}{n},$$

wherein γ is a value between zero and one, wherein $q_i$ is the average quality associated with agent i, wherein n is a number of agents from which the probability minimization algorithm is configured to select;

obtaining an indication that the agent has completed the task;

in response to the indication, computing, by the processor, a reward for the agent, wherein the reward is calculated according to a total contribution of the agent to the system by completing the task;

outputting the reward to be provided to the user;

whereby biasing said allocating to prefer allocating tasks to a first agent over a second agent, if a quality of the first agent is greater than a quality of the second agent, wherein said biasing is not dependent on prior knowledge of the qualities.

2. The method of claim 1, wherein said allocating comprises a probabilistic selection of an agent to perform the task, wherein the probabilistic selection is based on a set of probabilities, each of which is associated with an agent and based on an average quality of the agent.

3. The method of claim 1, wherein the average quality of tasks in the system that were completed in the past by the agent is calculated by dividing a summation of contributions to the system of tasks completed in the past by the agent, by a number of tasks in the system that were performed in the past by the agent.

4. The method of claim 1, wherein the system is a multi-tasks system that employs crowd-sourcing methodology to complete the tasks.

5. A computerized apparatus having a processor, the processor being adapted to perform the steps of:

obtaining a stream of tasks in a system, wherein the tasks are to be performed by agents, wherein the agents choose whether or not to perform a task, wherein a quality of each agent affects contributions of performing tasks by the agent;

calculating for each agent, an average quality of tasks in the system that were completed in the past by the agent;

allocating the tasks to the agents, wherein said allocating comprises selecting an agent to perform a task, wherein said selecting is based on the average quality of the agent, wherein said allocating comprises applying a probabilistic regret minimization algorithm to select agents to perform the tasks, wherein a probability to select agent i by the probability regret minimization algorithm is based on the following formula:

$$p_i = (1-\gamma) \cdot \frac{e^{q_i}}{\sum_{j=1}^{n} e^{q_j}} + \gamma \cdot \frac{1}{n},$$

wherein γ is a value between zero and one, wherein $q_i$ is the average quality associated with agent i, wherein n is a number of agents from which the probability minimization algorithm is configured to select;

obtaining an indication that the agent has completed the task;

in response to the indication, computing a reward for the agent, wherein the reward is calculated according to a total contribution of the agent to the system by completing the task;

outputting the reward to be provided to the user;

whereby biasing said allocating to prefer allocating tasks to a first agent over a second agent, if a quality of the first agent is greater than a quality of the second agent, wherein said biasing is not dependent on prior knowledge of the qualities.

6. The computerized apparatus of claim 5, wherein said allocating comprises a probabilistic selection of an agent to perform the task, wherein the probabilistic selection is based on a set of probabilities, each of which is associated with an agent and based on an average quality of the agent.

7. The computerized apparatus of claim 5, wherein the average quality of tasks in the system that were completed in the past by the agent is calculated by dividing a summation of contributions to the system of tasks completed in the past by the agent, by a number of tasks in the system that were performed in the past by the agent.

8. The computerized apparatus of claim 5, wherein the system is a multi-tasks system that employs crowd-sourcing methodology to complete the tasks.

9. A computer program product comprising a computer readable storage medium retaining program instructions, which program instructions when read by a processor, cause the processor to perform a method comprising:

obtaining a stream of tasks in a system, wherein the tasks are to be performed by agents, wherein the agents choose whether or not to perform a task, wherein a quality of each agent affects contributions of performing tasks by the agent;

calculating for each agent, an average quality of tasks in the system that were completed in the past by the agent;

allocating the tasks to the agents, wherein said allocating comprises selecting an agent to perform a task, wherein said selecting is based on the average quality of the agent, wherein said allocating comprises applying a probabilistic regret minimization algorithm to select agents to perform the tasks, wherein a probability to select agent i by the probability regret minimization algorithm is based on the following formula:

$$p_i = (1-\gamma) \cdot \frac{e^{q_i}}{\sum_{j=1}^{n} e^{q_j}} + \gamma \cdot \frac{1}{n},$$

wherein γ is a value between zero and one, wherein $q_i$ is the average quality associated with agent i, wherein n is a number of agents from which the probability minimization algorithm is configured to select;

obtaining an indication that the agent has completed the task;

in response to the indication, computing a reward for the agent, wherein the reward is calculated according to a total contribution of the agent to the system by completing the task;

outputting the reward to be provided to the user;

whereby biasing said allocating to prefer allocating tasks to a first agent over a second agent, if a quality of the first agent is greater than a quality of the second agent, wherein said biasing is not dependent on prior knowledge of the qualities.

10. The computer program product of claim 9, wherein said allocating comprises a probabilistic selection of an agent to perform the task, wherein the probabilistic selection is based on a set of probabilities, each of which is associated with an agent and based on an average quality of the agent.

11. The computer program product of claim 9, wherein the average quality of tasks in the system that were completed in the past by the agent is calculated by dividing a summation of contributions to the system of tasks completed in the past by the agent, by a number of tasks in the system that were performed in the past by the agent.

12. The computer program product of claim 9, wherein the system is a multi-tasks system that employs crowd-sourcing methodology to complete the tasks.

\* \* \* \* \*